Aug. 8, 1950  N. H. GODLEY ET AL  2,518,303
SIDE DELIVERY RAKE
Filed Oct. 24, 1947  3 Sheets-Sheet 3

Noah Howard Godley
and
Fred O. Godley,
Inventors.

Patented Aug. 8, 1950

2,518,303

UNITED STATES PATENT OFFICE 2,518,303

SIDE DELIVERY RAKE

Noah Howard Godley and Fred O. Godley, Charlotte, N. C., assignors, by mesne assignments, to Sperry Corporation, New York, N. Y., a corporation of Delaware Application October 24, 1947, Serial No. 781,946

6 Claims. (Cl. 56—27)

This invention relates to a side delivery rake and more especially to a type of rake having novel features such as adjustment to different angular positions for operation in a field and to another angular position relative to the tractor for transport along highways and the like.

It is an object of this invention to provide a side delivery rake having a wheeled frame with a rake reel frame and a rotary reel having tine shafts with tines thereon and mounted for rotation in the frame with means driven by the power takeoff of the tractor and for imparting rotation to the reel, and with means for adjusting the position of the frame relative to the tractor so that it may occupy a minimum of space for transport along narrow ways such as highways, farm roads, and the like.

It is another object of this invention to provide a side delivery rake having means whereby the direction of rotation of the rake reel may be reversed for use in scattering windrows which have been formed and which due to rain falling upon the same may need to be scattered for redrying before again raking and storing in barns and the like.

Some of the objects of the invention having been stated, other objects will appear as the description proceeds when taken in connection with the accompanying drawings, in which Figure 1 is a top plan view of the rake and showing it attached to the draw bar of a tractor;

Figure 1:
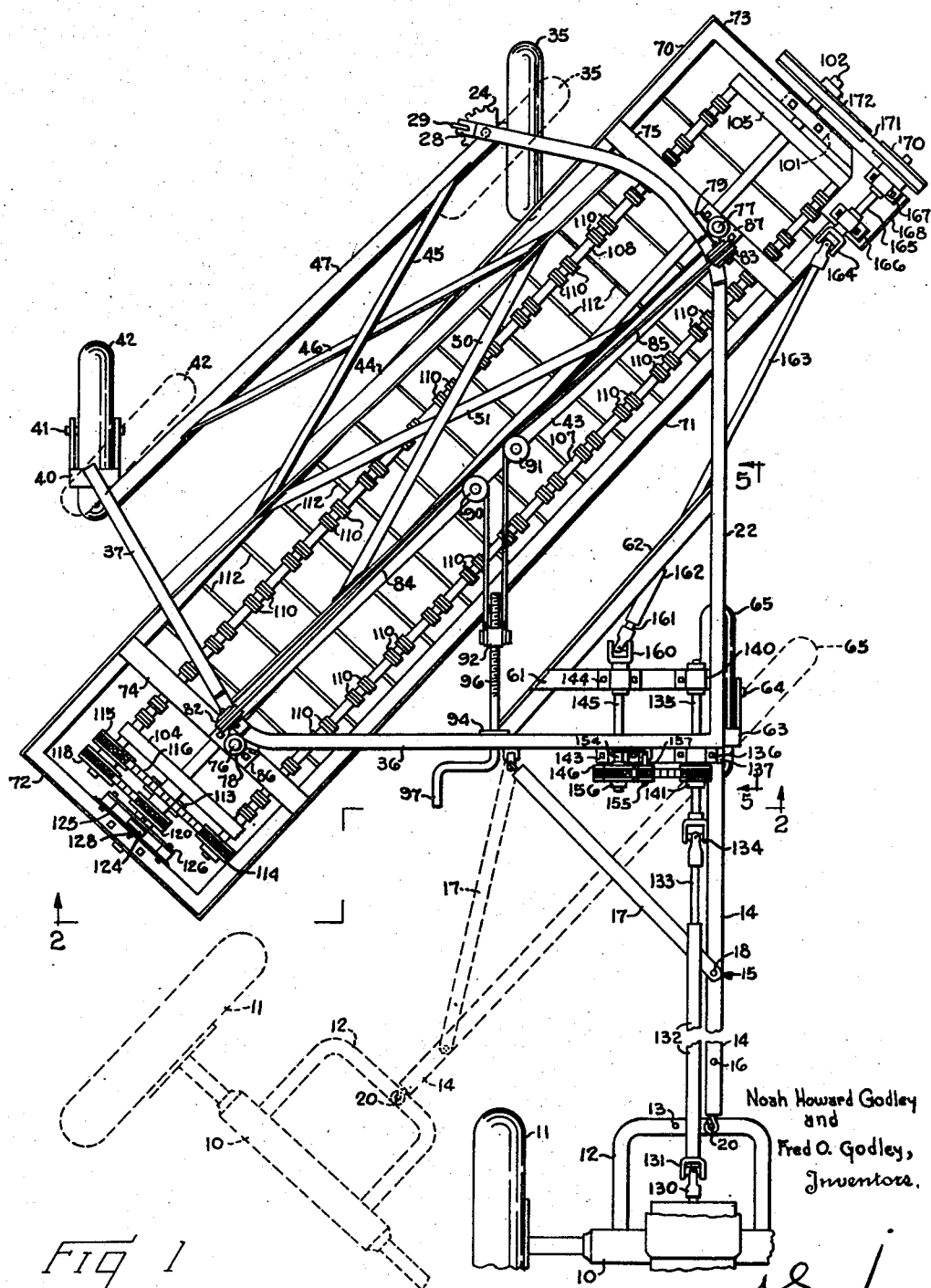

Referring more specifically to the drawings, the numeral 10 indicates a rear axle of a tractor having rear wheels 11 only one of which is shown. Extending from this tractor is a draw bar 12 having a plurality of holes 13 therein to which may be secured the forward end of a draw bar 14 having a hole at the point 15 and also having another hole 16. An auxiliary draw bar 17 may be secured at its front end to the draw bar 14 by means of the pin 18 being dropped through coinciding holes at the point 18 in the draw bar and the front end of the auxiliary draw bar 17.

The rear end of the draw bar 14 is pivotally connected to the frame of the tractor by any suitable means such as a pin 20 (Figure 1).

The main frame of the rake comprises an upper longitudinal bar 22 curved laterally as at 23 and having brackets 27 and 28 secured to its lower end and a vertically disposed shaft 25 is rotatably mounted in the lower end of the bar and a segment 24 is fixedly secured on the vertically disposed shaft 25. In the pair of brackets 27 and 28 a dog 29 is mounted for vertical sliding movement having a collar 30 fixedly secured thereon and surrounded by a compression spring 31 to hold the dog 29 in one of the notches of the segment 24 fixed on the shaft 25 and by means of which the angularity of this shaft with respect to the frame can be adjusted, as shown in dotted lines in Figure 1. The lower end of shaft 25 has a horizontally disposed stub shaft 34 fixedly secured thereto on which is mounted a ground wheel 35.

The frame is also provided with a front bar 36 secured to the forward end of angle bar 22 and projects laterally and is bent rearwardly as at 37 and downwardly as at 38 and has a forked caster member 40 pivotally secured in the lower end thereof, the caster member being forked and having an axle 41 in its lower end on which is rotatably mounted a ground wheel 42.

The main frame also comprises a bar 43 secured at its ends to the bars 36 and 22, and there is also a bar 44 secured between the portions 37 and 23 and suitable bracing bars 45 and 46 are secured between the bar 44 and a side bar 47. Also bracing bars 50 and 51 are secured between the parallel bars 44 and 43.

Figure 5:
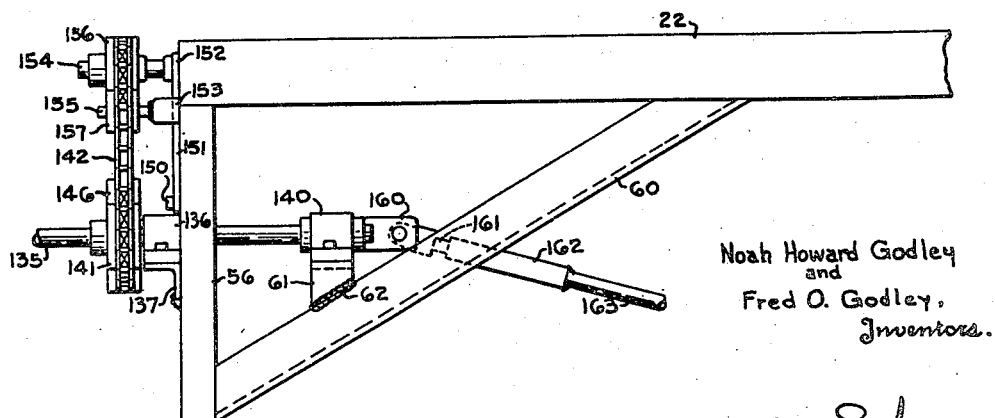
Figure 5 is an elevation taken along the line 5—5 in Figure 1.

The frame also comprises vertically disposed angle bars 55 and 56 secured at their upper ends to the front bar 36 and at their lower ends are secured to an angle bar 57. There is also a brace bar 58 extending diagonally between the bars 36 and 57 at the junction point of vertical bar 56 with an angularly disposed angle bar 60 (Figure 5) secured to the lower end of bar 56 and to an intermediate portion of the bar 22 rearwardly of the bar 56.

There is also a cross bar 61 downturned and secured at its right-hand end in Figure 1 to the bar 60 and downturned at its other end and secured to an angularly disposed angle bar 62.

At the junction point of the angle bars 56 and 57 and diagonal bar 60 is rotatably mounted a forked caster member 63 having an axle 64 in the lower ends thereof on which is mounted an additional ground wheel 65.

The angularly disposed angle bar 62 is secured at its lower end at the junction point of bars 55 and 57 and extends rearwardly and upwardly to the bar 22, adjacent the upper end of bar 60.

A reel frame is mounted in this wheeled frame work and is suspended therebelow. This reel frame comprises side angle bars 70 and 71 joined together at the ends by end angle bars 72 and 73 and arcuate bars 74 and 75 are secured between the side bars 70 and 71. Each of the arcuate bars 74 and 75 have rising upwardly therefrom and rigidly secured thereto upright shafts 76 and 77 which are slidably mounted in suitable cuff members 78 and 79 fixed on the remote sides of the angle bars 22 and 36. Also secured to these portions 78 and 79 are pulleys 82 and 83 on which are mounted the cables 84 and 85 which cables extend downwardly after passing over the pulleys 82 and 83 and are secured to the cuff members 86 and 87 which are secured to the arcuate bars 74 and 75 and which have rising therefrom the shafts 76 and 77.

The cables 84 and 85 pass around pulleys 90 and 91 mounted substantially centrally of the bar 43 and are secured at their forward ends to a cuff member 92 which is slidably mounted on a bar 93 welded at its front end to upright bar 56.

The channel bar 36 has welded to its rear surface a plate 94 and confined within the channel bar 36 and plate 94 and held thereby is an enlarged portion 95 integral with a threaded shaft 96 having a crank 97 on its front end and being threadably mounted in the cuff 92 at its rear end, the cuff 92 having a pin 90 in its lower end to confine the cuff 92 for sliding movement on bar 93 and whereby by rotating the crank 97 the cuff can be moved forwardly or rearwardly to thereby raise the reel frame or lower the same, as desired.

To the lower surface of the angle bars 72 and 73 are secured suitable bearing blocks 100 and 101 in which is rotatably mounted a reel shaft 102. This reel shaft 102 has three pronged spider members 104 and 105 fixedly secured thereon. Rotatably mounted in the outer ends of these three prongs of the spider members 104 and 105 are three tine shafts 106, 107 and 108, each of which has fixedly secured thereon a plurality of coiled spring tines 109 which are coiled around the shafts 106, 107 and 108 as at 110 and secured to the shafts by any suitable means such as bolts 111.

These tines in their lowermost position project through substantially semi-circular bars 112 which have their ends secured to the side bars 70 and 71. These act to clear hay and other vegetation from the tines during rotation of the reels.

Each of the tine shafts 106, 107 and 108 on their forward ends have sprocket wheels 113, 114 and 115 fixedly secured thereon on which is mounted a sprocket chain 116. Also on tine shaft 108 is fixed another sprocket wheel 118 which has a sprocket chain 119 mounted thereon, which sprocket chain is also mounted on a sprocket wheel 120 which is rotatably mounted on the reel shaft 102. The sprocket wheel 120 has integral therewith a hub portion 123 which has integral therewith a lever 124 which passes between two arcuate bars 125 and 126 and said bars have coinciding holes 127 therethrough through which a bolt 128 may be passed and passes through a suitable hole, not shown, in the lever 124 for securing the lever in adjusted position to thus regulate the angularity of the tines 109 with respect to the vertical.

The means for imparting rotation to the reel shaft is driven from the power takeoff of the tractor having a universal joint 131 which is connected to a shaft 132, said shaft 132 being tubular and having a square or irregular bore on the inside thereof, into which is fitted a mating shaft 133 having a universal joint 134 on its rear end which is connected to a shaft 135 mounted in a bearing 136 on a supporting angle bar 137 secured at one end to upright angle bar 56. The shaft extends rearwardly and is supported in a bearing 140 mounted on a bar 61. The shaft 135 has fixed thereon a sprocket wheel 141 on which a sprocket chain 142 is mounted. Also mounted in bearings 143 and 144 is a shaft 145 which has a sprocket wheel 146 thereon on which the sprocket chain 142 is also mounted.

Pivoted as at 150 on bar 58 is one end of a bar 151 which has two projecting portions 152 and 153, in the free ends of which stub shafts 154 and 155 are secured, having idler sprockets 156 and 157 thereon on which the sprocket chain 142 is also mounted. The rear end of shaft 145 has a universal joint 160 thereon which has projecting therefrom an irregularly shaped shaft 161 which telescopically fits into a tubular portion 162 on the front end of a shaft 163 whose rear end has a universal joint 164 connecting the same to a shaft 165 mounted in bearings 166 and 167 secured on a plate 168 which is welded to the top of frame bars 71 and 73. This shaft 165 has a V-pulley 170 on its rear end on which is mounted a V-belt 171, which, in turn, is mounted on a larger V-pulley 172 secured on the rear end of reel shaft 102.

The reason for the telescopic arrangement of tube 132 and shaft 133 is that when it is desired to transport the rake from place to place along narrow roads and the like, the pin 18 is removed from the hole at point 15 in draw bar 14 and is moved into hole 16 after passing through the hole in the front of the auxiliary draw bar 17 and the tractor and frame will occupy the dotted line position shown in Figure 1.

The reason for the telescopic arrangement between shaft 161 and tubular portion 162 is to compensate for the overall length of the driving connection between universal joints 160 and 164 when the reel frame is raised or lowered by means of turning crank 97.

Figure 2:
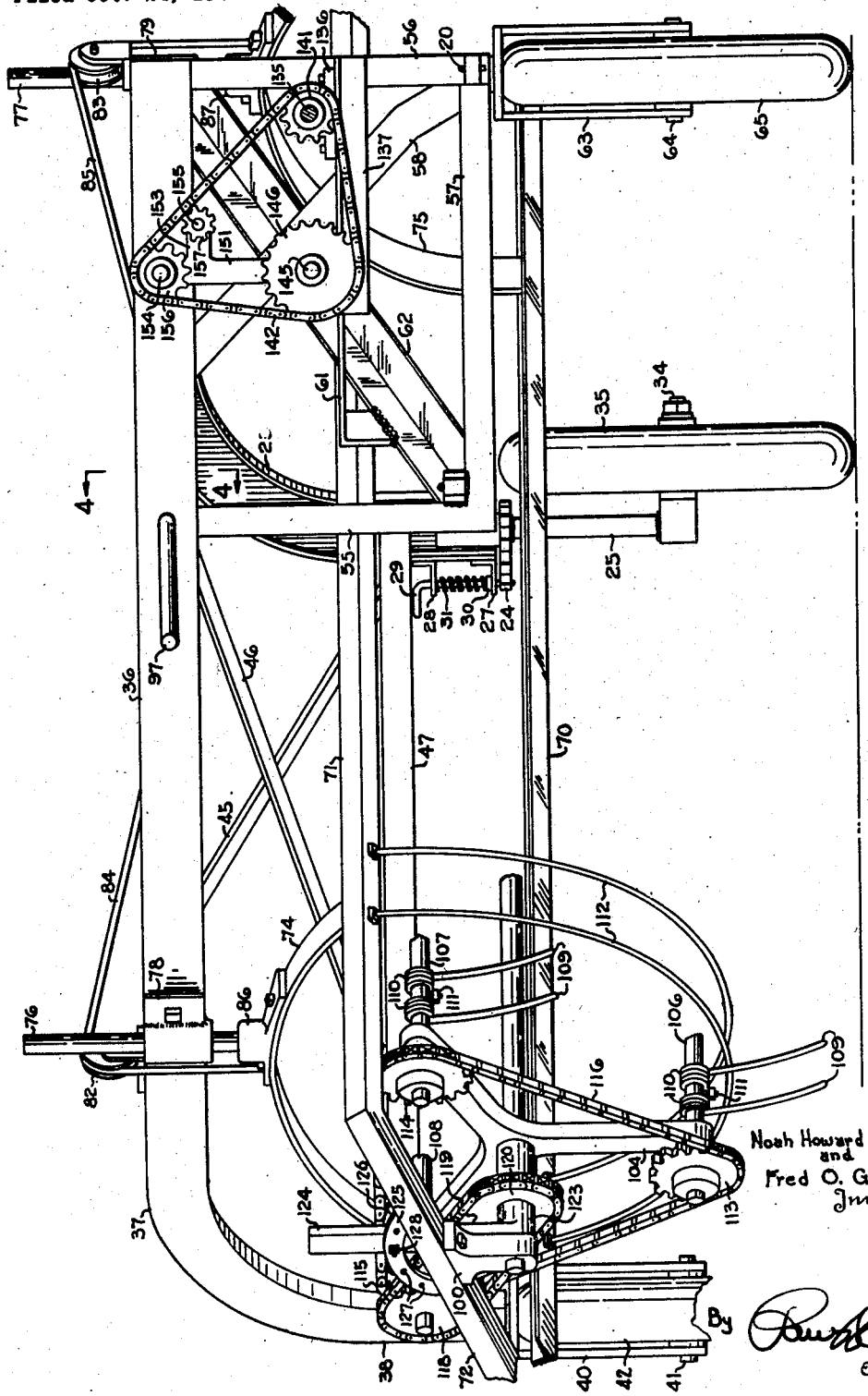
Figure 2 is an end view looking from along the line 2—2 in Figure 1 and omitting the draw bar mechanism.
Figure 3:
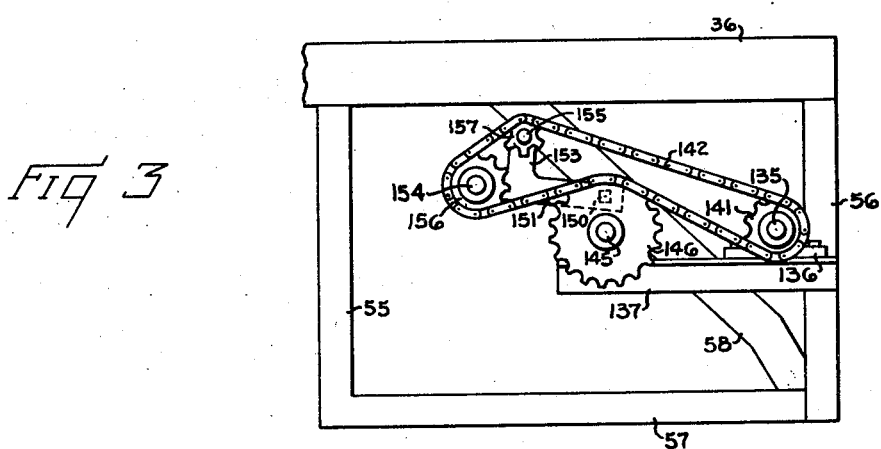
Figure 3 is a view of the upper right-hand corner of Figure 2 and showing the parts in a position for driving the rake in a rake reel in a reverse direction from the direction it would be driven with the parts in the position in Figure 2.
Figure 4:
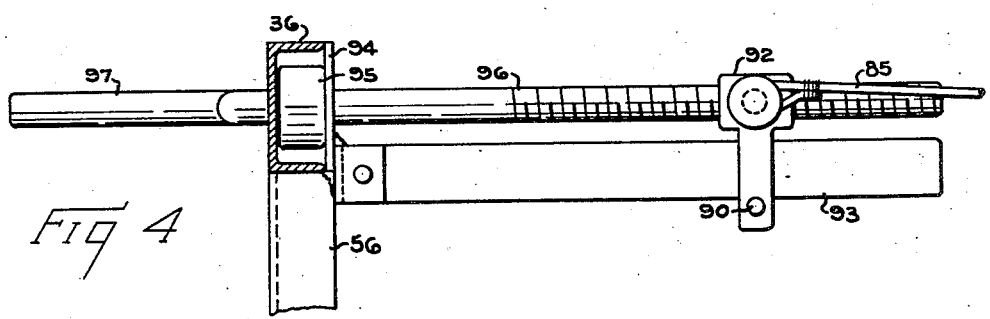
Figure 4 is a sectional detail view taken along the line 4—4 in Figure 2.

In the position which is seen in Figure 2, the parts are in a position where counter-clockwise movement will be given to the reel shaft 102 and spider members 104 as viewed in Figure 2. This is the position the parts will occupy during a regular side delivery raking operation. However, in the event that after the windrows have been formed, a rain should fall upon the same and they should have to be scattered, by moving the member 151 to the position shown in Figure 3 and reversing the position of the sprocket chain 142 with relation to sprocket wheel 146, or to the position shown in Figure 3, the direction of rotation of the reel shaft 102 and the tine shafts as well will be reversed and this will cause the tines 109 to engage and scatter the windrows which have been formed by a previous raking operation so that the hay or the vegetation will properly dry and can again be raked by passing the rake over the same again with the parts adjusted in the position shown in Figure 2.

In the drawings and specification there has been set forth a preferred embodiment of the invention, and although specific terms are employed, they are used in a generic and descriptive sense only, and not for purposes of limitation, the scope of the invention being defined in the claims.

We claim:

1. A side delivery rake comprising a main frame having a driven shaft rotatably mounted therein, the main frame having a pair of swiveled ground wheels mounted on the rear portion thereof for supporting the rear portion of the main frame and the front portion of the main frame having a swiveled ground wheel for supporting the front end of the frame, a forwardly extending draw bar pivotally connected at its rear end to a front side portion of the main frame, a reel frame mounted in the main frame and having a pair of upwardly projecting shafts slidably mounted for vertical movement in the main frame, a pair of cables having one of their ends connected to the front and rear portions of the reel frame and having the other ends of the cable projecting forwardly in the frame, a rearwardly and forwardly movable block member to which the front ends of the cables are connected, a crank having a threaded portion for engaging the block to which the front ends of the cables are connected, whereby rotation of the crank will raise and lower the reel frame relative to the main frame, a second shaft mounted in the main frame and extending rearwardly and a driving connection between the first and second shafts in the main frame, said reel frame comprising a rotatable reel having a reel shaft and a spider fixed at each end thereof and a plurality of tine shafts rotatably mounted in the spider members and each of the tine shafts having tines thereon, a rotatable shaft mounted in the rear end of the reel frame and a driving connection between said last-named rotatable shaft and the first-named rotatable shaft mounted in the main frame, and a driving connection between the rotatable shaft mounted in the rear portion of the reel frame and the reel shaft and means for reversing the direction of rotation of the rear shaft to drive the reel in an opposite direction as desired, the draw bar having one or more holes intermediate its ends, a second draw bar having its rear end pivotally connected to the front end of the main frame at a point removed from the point where the first draw bar is connected to the main frame, the front end of the second draw bar having means for securing the same in one of the holes in the first draw bar to thereby hold the first draw bar in angular relation to the front end of the main frame.

2. In a side delivery rake, a main frame having a swiveled ground wheel supporting the front portion thereof and having a pair of swiveled ground wheels supporting the rear end and the other side portion of the main frame, a reel frame suspended from the main frame and having a rotary reel therein, means for driving the rotary reel comprising a shaft mounted on the reel frame and having a driving connection with the reel, a forwardly projecting connecting shaft connected to the first-named shaft and a third shaft mounted near the front end of the main frame, said main frame having a draw bar pivotally secured thereto at its rear end and adapted to have its front end secured to a suitable prime mover, said draw bar having a second auxiliary draw bar detachably secured thereto and to an intermediate portion of the front portion of the main frame, the auxiliary draw bar being adapted to be disconnected from the main draw bar at one point and connected to the main draw bar at another point to align the main draw bar with the longitudinal axis of the reel frame to lessen the lateral dimensions of the frame for passing along narrow roadways, and a driven shaft rotatably mounted in the front of the main frame in parallel position to the third shaft and a driving connection between the driven shaft and third shaft for imparting rotation to the reel frame, and means for reversing the direction of rotation imparted to the reel frame.

3. In a side delivery rake comprising a main frame and a plurality of wheels for supporting the main frame, all of said wheels being swiveled and means for locking one of the wheels in rigid position, said main frame having a reel frame suspended therebelow and a rotary reel mounted in the reel frame, said main frame having a main draw bar pivotally secured to the front end thereof and having means on its other end connectable to a prime mover, an auxiliary draw bar connected to an intermediate portion of the main draw bar and to the front portion of the main frame in spaced relation to the point of connection of the rear end of the main draw bar thereto, said main draw bar having a plurality of holes therein and means for detachably connecting the front end of the auxiliary draw bar at different points to cause the main draw bar and the reel frame to occupy less road space, the means for imparting rotation to the reel frame comprising a driven shaft mounted in the main frame, a second shaft mounted in the front end of the main frame and in parallel relation to the first-named shaft, a sprocket wheel and sprocket chain connection between the first and second shafts in the main frame, a third shaft rotatably mounted in the reel frame and having a driving connection with the reel for imparting rotation thereto, a connecting shaft universally connected at its front and rear ends to the second and third shafts respectively and whereby rotation imparted to the driven shaft will impart rotation to the reel shaft, a pivoted member associated with the second shaft and having idler sprocket wheels thereon and onto which the sprocket chain mounted on the sprocket wheels on the first and second shafts is adapted to be mounted, and said pivoted means being swingable to one position to cause the sprocket chain to engage one side of the sprocket wheel on the second-named shaft to drive the reel in one direction and being swingable to another position to cause the sprocket chain to engage the opposite side of the sprocket wheel on the second-named shaft for imparting rotation in a reverse direction to the reel.

4. In a side delivery rake comprising a wheeled frame and a reel frame suspended thereby and a rotary reel disposed in the reel frame, the front side of the main frame having a main draw bar pivoted thereto at its rear end and being adapted to be connected to a prime mover at its front end, an auxiliary draw bar pivotally connected at its rear end to an intermediate front portion of the main frame and at its front end to an intermediate portion of the main draw bar and means for connecting the front end of the auxiliary draw bar to another point closer to the front end of and along the main draw bar to align the main draw bar with the longitudinal axis of the reel frame to cause the main draw bar and the wheeled frame to occupy a lesser road width, said main draw bar being arranged in offset and generally parallel relation with respect to the longitudinal axis of the reel frame, and the main frame having a plurality of swiveled wheels for supporting the same and means for locking at least one of the wheels against swiveling.

5. A side delivery rake comprising a main frame and a reel frame suspended therefrom and mounted for up and down movement relative to the main frame, the reel frame having its longitudinal axis angularly disposed with reference to the normal line of travel of the main frame, a plurality of swiveled ground wheels for supporting the main frame, means for locking at least one of the ground wheels against swiveling as desired, a main draw bar pivoted at its rear end to the front end of the main frame, an auxiliary draw bar pivoted at its rear end to an intermediate portion of the front end of the main frame at a point remote from the pivot point of the main draw bar and detachably secured at its front end to an intermediate portion of the main draw bar, said auxiliary draw bar being detachable from one portion of the main draw bar and securable to another portion of the main draw bar to hold the longitudinal axis of the main draw bar in a vertical plane which is parallel to the longitudinal axis of the reel frame, and said longitudinal axis of the main draw bar also being offset laterally with respect to the longitudinal axis of the reel frame.

6. A side delivery rake comprising a main frame having a plurality of swiveled ground wheels for supporting the same, means for locking at least one of the ground wheels against swiveling as desired, a reel frame mounted for up and down movement relative to the main frame, means on the main frame for supporting the reel frame and adjusting the height thereof relative to the ground, a draw bar pivotally secured at its rear end to the main frame, said main frame having an auxiliary draw bar pivotally secured to an intermediate portion of the front portion of the main frame remote from the pivot point of the main draw bar and detachably secured at its front end to an intermediate portion of the draw bar, said auxiliary draw bar being adapted to be secured to another point forwardly along the main draw bar for alining the longitudinal axis of the main draw bar in a vertical plane which is parallel to but offset somewhat from a vertical plane passing through the longitudinal axis of the reel frame for transport along narrow roadways and the like.

NOAH HOWARD GODLEY.
FRED O. GODLEY.

REFERENCES CITED

The following references are of record in the file of this patent:

UNITED STATES PATENTS

| Number | Name | Date |
|---|---|---|
| 828,119 | Johnston | Aug. 7, 1906 |
| 1,406,970 | Bowers | Feb. 21, 1922 |
| 2,255,288 | Jones et al. | Sept. 9, 1941 |
| 2,436,475 | Jones et al. | Feb. 24, 1948 |

FOREIGN PATENTS

| Number | Country | Date |
|---|---|---|
| 97,373 | Switzerland | Jan. 16, 1923 |